(12) United States Patent
Proctor

(10) Patent No.: US 6,271,951 B1
(45) Date of Patent: Aug. 7, 2001

(54) TELECOMMUNICATIONS NETWORK

(75) Inventor: Richard J Proctor, Wimborne (GB)

(73) Assignee: Marconi Communications Limited (GB)

( * ) Notice: Subject to any disclaimer, the term of this patent is extended or adjusted under 35 U.S.C. 154(b) by 0 days.

(21) Appl. No.: 08/905,499

(22) Filed: Aug. 4, 1997

(30) Foreign Application Priority Data

Aug. 3, 1996 (GB) .................................................. 9616380

(51) Int. Cl.⁷ ...................................................... H04J 14/08
(52) U.S. Cl. ........................... 359/137; 359/135; 359/125
(58) Field of Search .................................. 359/123, 135, 359/136, 137, 167; 370/486, 487, 498

(56) References Cited

U.S. PATENT DOCUMENTS 5,872,645 * 2/1999 Proctor ................................. 359/136

FOREIGN PATENT DOCUMENTS

| 0 425 871 A2 | 5/1991 | (EP) . |
| 2 291 299 A | 1/1996 | (GB) . |
| 2 291 311 A | 1/1996 | (GB) . |
| WO 89/05070 | 6/1989 | (WO) . |

* cited by examiner

*Primary Examiner*—Leslie Pascal
(74) *Attorney, Agent, or Firm*—Kirschstein, et al.

(57) ABSTRACT

An optical communications network comprising a Head End Unit connected to a plurality of groups of Network Termination Equipments (NTE) and/or Optical Network Units (ONU), wherein downstream communication is by Time Division Multiplex, wherein a group is multiplexed onto a stream and a plurality of streams are combined into a higher speed multiplex and upstream communication is by Time Division Multiplex Access is characterized by enabling the NTE's or ONU's to negotiate bandwidth in respect of low level upstream traffic and by pre-allocating bandwidth to individual NTE's or ONU's in respect of high level upstream traffic.

12 Claims, 3 Drawing Sheets

TELECOMMUNICATIONS NETWORK

BACKGROUND OF THE INVENTION

The present invention relates to telecommunications networks and is by way of a development of and improvement in the telecommunications networks disclosed in my earlier UK patent application Nos. 2,291,311 (U.S. application Ser. No. 08/498,090, now allowed) and 2,291,299 (U.S. application Ser. No. 08/498,427, now U.S. Pat. No. 5,872,645) which generally relate to an Asynchronous Transfer Mode (ATM) based network system, which patent specifications are hereby incorporated by reference.

In a telecommunications network a large number of end users/customers are connected or connectable to a so-called head-end unit from which data can be received by each customer and to which data may be sent by each customer. In traditional telecommunications networks such data would be in the form of analogue voice signals and more lately in the form of digital signals.

In contrast, in the present day sophisticated network systems there is a requirement to enable data representing numerous kinds of services to be transmitted between the head-end unit and individual customers.

This requirement results in the need to accommodate high volumes of data, i.e. there is a requirement for relatively high overall bandwidth.

This requirement could theoretically be met by simply providing the network with links having the maximum data carrying capacity that is likely to be required under all operating conditions. However, such an approach would be uneconomical in that for much of the time there would be significant excess unused data carrying capacity, i.e. there would be significant redundancy in the system.

My earlier UK patent application Nos. 2,291,311 and 2,291,299 are concerned with the problem of providing capacity in the data links between the head-end unit and the large number of individual customers sufficient to satisfy the customers' requirements whilst at the same time being economical to install.

In the networks of these two earlier patent applications the architecture is designed to handle a large range of volume of customers from a few up to several thousands. This is achieved by arranging customers in groups (typically thirty-two customers) and having them share the ATM bandwidth of a common ATM pipe so that many such groups of customers can co-exist on the same system. These networks are capable of handling up to 50 Mbits of bidirectional traffic for each customer. The network disclosed in UK 2,291,311 is to a significant extent an analogue system whereas that disclosed in UK 2,291,299 is essentially a digital system.

Although both these systems go a significant way towards providing high capacity links between the individual customers and the head-end unit at an economical cost they have operational limitations which the present invention is concerned with overcoming or at least reducing.

In both of these earlier discussed networks there was no interaction between the different groups of thirty-two customers in the sense that any transmission both to and from those customers was within one stream and one stream only. This results in low power NTEs but is inefficient in its use of the network capacity. This has the effect that any broadcast service that needs to be sent to two customers on different streams resulted in two copies of the data being sent, one to each of the streams. This also limits the upstream bandwidth from the customers on one stream to the capacity of that stream only, even it there is spare capacity on one other stream.

Data travelling from the head end towards the customer is called "downstream traffic", data travelling from the customer towards the network is called "upstream traffic". There are two types of downstream traffic namely, point to point traffic which goes to one customer only and broadcast traffic which can go to many customers. There is only point to point traffic in upstream traffic.

In the previous systems as disclosed in UK 2,291,311 and UK 2,291,299 the customer's equipment only looked for their own point to point traffic and any broadcast channels they wanted from their own stream. Likewise they could only transmit data upstream on their stream after they had negotiated with the head-end to send a cell on that stream.

SUMMARY OF THE INVENTION

According to the aspect of the present invention broadcast traffic is sent through any stream once and only once and can be accessed by any customer on any stream. Thus it only need be sent once and this means that the system uses the downstream bandwidth more efficiently if it is carrying many broadcast channels.

According to a second aspect of the present invention, some of the point to point traffic to a high usage customer can be sent via other stream(s) than the "normal" stream by treating such traffic as "broadcast traffic" even though it is only accessed by one customer. This allows the customer's normal stream to be loaded with less traffic and thus enables it to carry the traffic for high use customers with less effect on the low use customers and enables the traffic balance to be improved.

According to a third aspect of the present invention some of the upstream traffic from a high usage customer can be sent via other stream(s) than the normal stream. This additional capacity is pre-allocated to customers who are requesting a lot of bandwidth, thus balancing the load between the different streams. This contrasts with the earlier mentioned systems where there is pre-allocation of bandwidth for low level usage and negotiation of bandwidth for high level usage.

The present invention thus provides a system which is kept simple in relation to low volume users but at the same time offers large volume users prompt extra capacity when required.

In such a network system the cost of the network termination equipment (NTE), i.e. the equipment at the customer end, is extremely price sensitive. It is therefore necessary that any hardware modifications that are proposed to be made to such a network, in order to overcome the problems discussed should not significantly increase the cost of the NTE. The implementation of the present invention achieves this objective.

How the invention may be carried out will now be described by way of example only and with reference to the accompanying drawings in which:

DETAILED DESCRIPTION OF THE EMBODIMENTS

Figure 1:
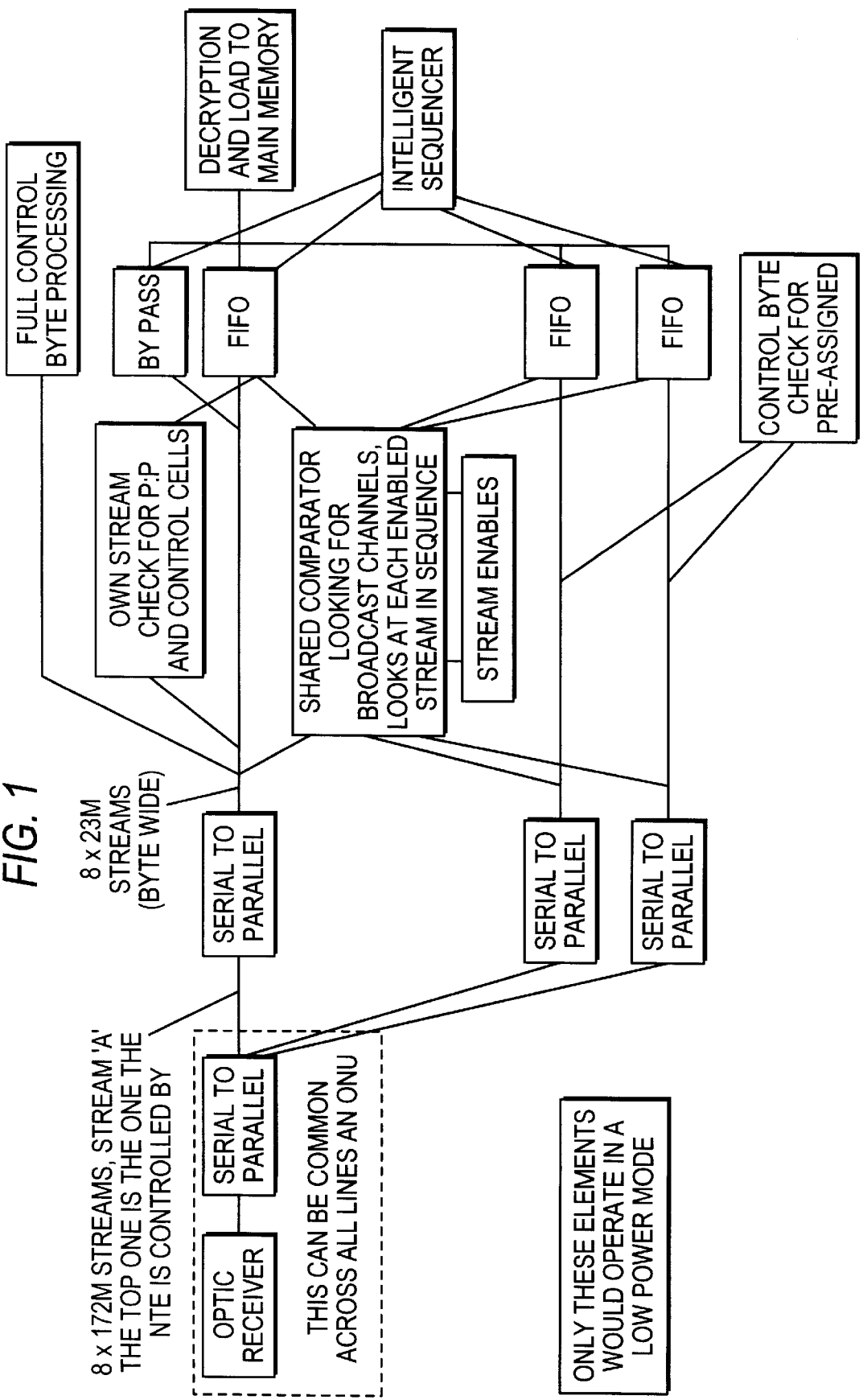
FIG. 1 illustrates a first modification to an NTE, according to the present invention, to provide bit interleaving in respect of downstream traffic.

The present invention is a development of or a modification to the system disclosed in my copending published UK application No. 2,291,299 the specification and drawings of which are hereby incorporated by reference in order to make it unnecessary to again describe and illustrate that system in the present specification.

Comparing the present invention with the invention disclosed in UK 2,291,299, in that system any additional capacity required by a given customer is allocated on the basis of in effect negotiation. That is, the customer first requests the additional capacity, the head-end unit then considers the request against a view of the overall capacity available and finally agrees or otherwise to allocate some extra capacity to the requesting customer (see FIG. 11 of UK 2,291,299). In this earlier system there is pre-allocation of bandwidth for low load traffic coupled with negotiation for extra bandwidth for high load traffic. In other words those customers who only make light use of the network are pre-allocated bandwidth whereas those customers who make heavy use of the network have to negotiate for any extra bandwidth that they might require.

The present invention is concerned with providing an improvement in or modification to this approach whilst at the same time enabling the existing technology to be employed thus minimizing the incremental cost of implementing such an improvement.

According to the present invention such a network system is arranged so that there is negotiation of bandwidth for low level traffic coupled with pre-allocation of bandwidth for high level traffic, i.e. overload.

A key feature of the present invention is that in the downstream mode broadcast traffic can be extracted from any of the eight streams. It is necessary to phase the eight streams so they are an equal time apart, allowing the broadcast matching logic to work sequentially over each stream in turn.

Each NTE is designed with logic which will enable it to extract broadcast traffic from any stream when it needs to. Thus it is only looking at those streams which have some traffic, and in a low power mode it need only ever consider one stream.

In the upstream mode a Network Termination Equipment (NTE) or Optical Network Unit (ONU) could be assigned, on a longer term basis, additional cell slots across any of the eight streams. Over a 250 μs frame there are thirty-two cell slots per stream, and eight streams. Any of these 256 slots could be permanently assigned to a given NTE for longer term use when the load from any NTE gets too high. This allocation would be by the Optical Line Termination's (OLT's) main processor and can assign slots on relatively lightly loaded streams to particularly heavy NTE's. Thus the whole upstream bandwidth is available. This is a key feature of the invention.

There are considerations of cell sequence integrity. It would be complicated to send different Virtual Circuits different ways, therefore the system must ensure cell sequence integrity across separate streams. This has the most impact on the stream processors in the OLT. The upstream data has to be multiplexed with POTS (Plain Old Telephone System) traffic and injected cells. The simplest way to ensure this is to force a fixed delay across the stream processor.

The NTE is adapted to be able to send cells in two ways, both in the cell by cell controlled way and in pre-assigned slots.

The eight streams must be spread out evenly over time.

The upstream path across the stream processor and the arrangement of the consolidation switch is designated with a constant delay to ensure cell sequence integrity.

The processor in the OLT is adapted to monitor the upstream load through the stream processors. If an NTE gets rather busy the stream processor is adapted to pre-assign the NTE extra slots on low use streams and when the load from that NTE drops the stream processor is designed to pre-assign the extra slots.

The slot assignment function in the stream processor is such that it knows what slots are pre-assigned, and how many pre-assigned slots each NTE it is managing has. To aid the system and to help prevent errors propagating, the control slot downstream that is controlling the upstream preferably has an extended definition such as:

| 3 | Control Upstream | |
|---|---|---|
| | 010NTEID | The identified NTE can send a cell |
| | 01111110 | Pre-assigned slot |
| | 01111111 | No NTEs to send a cell |

The stream processor would keep a count of actual cells using each pre-assigned slots so that the main OLT processor can decide to reduce pre-assigned slots when they are not required.

The division of responsibility between the dedicated flow control processor within the stream processor and the main OLT processor to manage pre-assigned slots is selected to give optimum performance.

The way in which downstream information is extracted is a key element and will now be considered.

The downstream data could be multiplexed in several ways such as by bit or byte or word or cell interleaving, each of these having the advantages and disadvantages indicated below.

| Multiplexing Type | Advantages | Disadvantages |
|---|---|---|
| Bit Interleaving | Very simple to send from the head end. Easy to select one stream with minimal logic on the NTE. Data does not need to be scrambled (alternate streams inverted). | When handling several stream results in complex handling of multiple stream. (Multiple FIFOs in the NTE). |
| Byte Interleaving | Very simple for head end. Data does not need to be scrambled. | Just as complex for the NTE as bit interleaving. |
| Word Interleaving | | Getting complex for the head end and the NTE. Data will probably have to be scrambled. |
| Cell Interleaving | Simplest for the NTE to handle, if it is handling more than one stream. | Heeds multiplexing at the head end. More power required when NTE only requires a single stream. The data will probably have to be scrambled. |

Given that the NTE is very cost sensitive the cell interleaving is preferred, though from a power point of view bit interleaving would yield the best results for lower power operation.

If cell interleaving is used, then the downstream cells may need to be scrambled. If this is necessary the scrambler should operate as a cell scrambler that does not depend on any memory between cells. The encryption may be sufficient to make this unnecessary.

Having described the operation according to the present invention, the construction of the NTE will now be described in relation to how it varies from the NTE used in the system described in UK Patent Application No. 2,291,299.

There will now be described, with reference to FIGS. 1 and 2 two of the four downstream interleaving methods referred to immediately above, namely bit interleaving and cell interleaving respectively.

Referring to FIG. 1, which relates to bit interleaving, the term "Stream A" is used to refer to that stream of the NTE which has its own Point-to-Point (P:P) and control information.

The input of 1.4 G is divided into the eight streams of 172M each, each of these streams then goes through a further serial to parallel conversion yielding eight data bits at 23M. The master stream for the NTE has the control byte extracted and the Virtual Path Identifier (VPI) is passed both to the checking for P:P cells (VPI 00xxxxxxxxxx, and VPI 1xxxxxxxxxxx), and for the shared checker for broadcast cells (VPI 01xxxxxxxxxx). If either finds that the cells is wanted it enables the FIFO for that stream to load the rest of the cell and if not it pauses the S/P conversion for that stream until the end of that cell.

Similar processing is performed for each of the other seven streams, apart from the absence of the P:P traffic checking. The FIFO's are then emptied in an intelligent manner into the "normal" logic of the NTE such as decryption and the loading of the cell into memory as described in UK 2,291,299. The sequencer would normally allow the eight FIFO's to be emptied in a round robin manner. However, in the event of a FIFO getting critically full it will break the sequence to give that one preference. Stream A is given the highest preference so that the P:P and control traffic can get through.

Only those streams carrying broadcast channels that the NTE actually is selecting and stream A will be analyzed and processed further. If the NTE is in a low power "battery" mode of operation only the P:P checking on stream A will be enabled and the FIFO can be bypassed.

The capacity of each of the buffering FIFO's will be relatively short, e.g. 6 cells from stream A, 3 cells from other streams, compared with what would be needed if the traffic was unstructured at 1.2 G. These FIFO's will be within the CMOS logic and would preferably be provided using a small block of RAM.

The FIFO's need to be independent as each of the eight FIFO's can be loading data at 23M at the same time, even though only one would be being emptied at any time.

The control byte in all streams is checked for "pre-assigned" slot designators when pre-assigned slots are used upstream. This is to check for errors.

Figure 2:
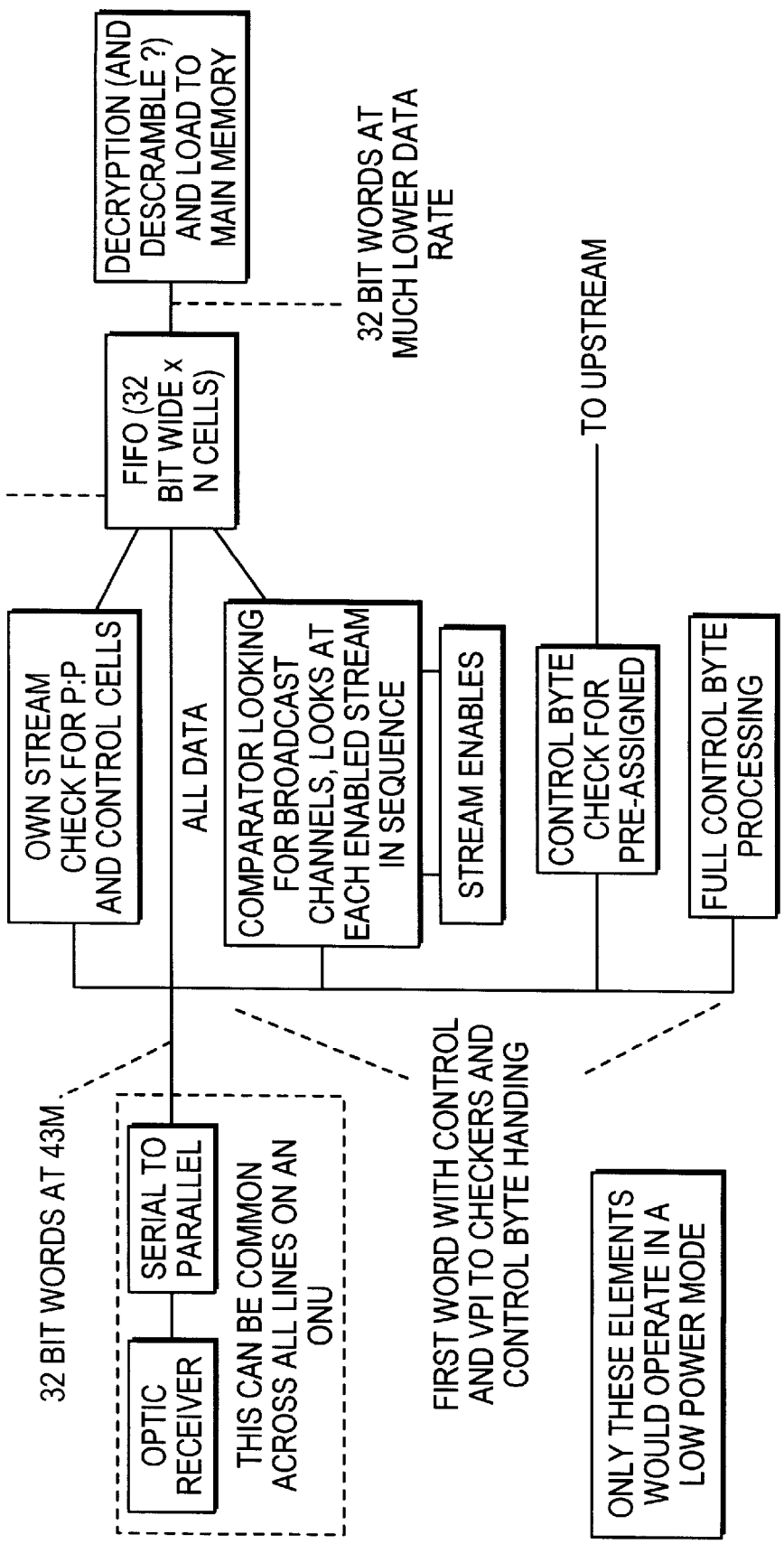
FIG. 2 is similar to FIG. 1 but illustrating the alternative of cell interleaving in respect of a second modification of an NTE according to the present invention.

Referring to FIG. 2, which relates to cell interleaving, the input 1.4 G is converted into 32 bit wide words operating at 43M and passed to the "lower speed" buffering logic. This logic looks at the first 32 bit word for each cell. The control byte is processed separately from the VPI.

The Control byte is processed in two ways, "Full processing" which applies only to the NTE's on the stream and "Pre-assigned processing" for other streams. "Full processing" includes a general processor looking for frame alignment and sequencing of the system. The "Pre-assigned" processing looks for pre-assigned cell slots and passes this over to the upstream side to check when it can use pre-assigned slots.

There are eight streams, the one the NTE is controlled by called here "Stream A" and the rest. On stream A, the VPI's are checked for P:P cells to that NTE (VPI 1nnnnnXXXXXX) and general control cells (VPI 00xxxxxxxxxx). If it spots a cell that needs processing it enables the cell to be loaded into the FIFO. For all streams the VPI's for broadcast are checked by the broadcast comparator matching VPI 01 xxxxxxxxxx with one of 16 stored values. If it matches it enables the cell to be loaded into the FIFO in order to record which of the 16 it is, thus making later translation and decryption easier. For example, by replacing the VPI by 01000000nnnn where nnnn is the matched number this number may be 16 or as low as 8.

In a low power mode, the broadcast comparator and the checking for pre-assigned slots may be turned off and the FIFO dispensed with.

The FIFO is loaded at 43M, and emptied at the same time at a lower rate to suit the rest of the NTE. The FIFO is 16 entries long.

Figure 3:
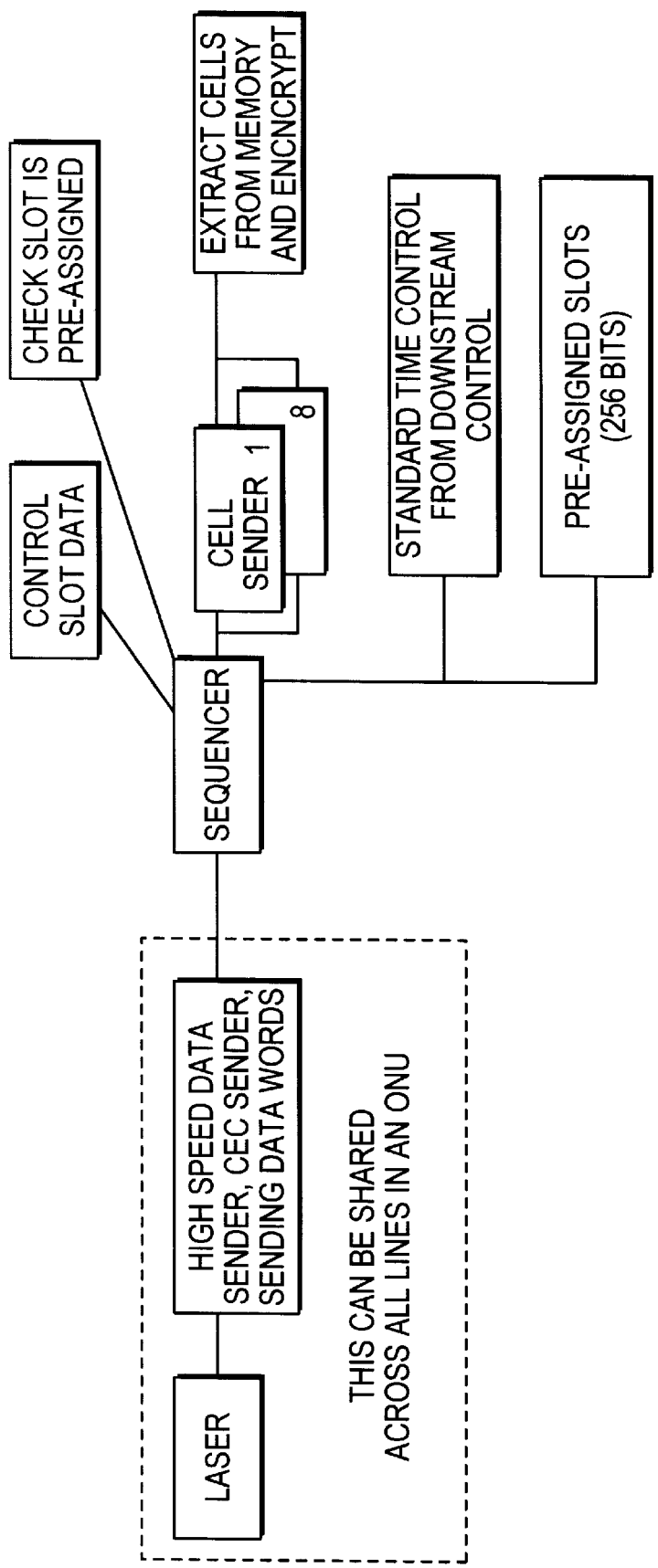
FIG. 3 illustrates a modification of an NTE, according to the present invention, in respect of the handling of upstream traffic.

Referring to FIG. 3 which illustrates the upstream modification of the NTE.

The NTE is adapted to be able to send more than one cell at once. The data transfer from the low speed CMOS and the high speed data transmission is designed to allow a data transfer of usually (400M). This is turn will enable the CMOS to send word consecutively to the high speed logic that is to be sent.

Cells are read from memory and have added to them any standard processing such as encryption and Format Error Correction (FEC). They are then loaded into the next available of the eight cell senders. The sequencer controls the transmission of this and also the control slot data to the high speed data sender. The control slots are sent under standard control. The cells are sent either in pre-assigned slots or in designated slots when told to by the downstream control information.

It may not be practical to have as many as eight cell senders. In that case the number would be limited by the capability of the extraction function to supply cells. In a low power, battery mode only one cell sender need be used. The interface between the sequencer and high speed sender could be 64 bits at 8M or 32 bits at 16M. Having say three cell senders would limit the upstream capacity to 150M. The number of cell senders needs to be known by the processor in the OLT that is deciding what slots to pre-assign.

The NTE checks that when it expects to use a pre-assigned slot that the slot is pre-assigned. If it expects to use a pre-assigned slot and it is not pre-assigned it would not transmit any data but would query the data with the OLT.

When the NTE requests data transmission upstream its request is for its additional requirements above that which has already been pre-assigned.

With the system according to the present invention all the streams on an OLT would have to use the same range.

The main advantage of the present invention is that if a user does genuinely have a vast amount of downstream P:P traffic, whole Virtual Paths of this can be off loaded from the NTE's normal stream downstream through the broadcast mechanism if necessary.

Thus the system of the present invention provides in the downstream direction "virtual broadcast" from any of the eight streams and point-to-point traffic from one only. In other words the full 1.2 G is available for broadcast applications. It provides in the upstream direction cell by cell negotiation on one stream (i.e. from 50M) with other slots on any of the eight streams being pre-assignable (i.e. from the remaining 350M).

I claim:

1. An optical communications network, comprising: a head end unit connected to a plurality of groups of network termination equipments (NTE) and/or optical network units (ONU), wherein downstream communication is by time division multiplex, wherein one of the groups is multiplexed onto a stream, wherein a plurality of streams is combined into a higher speed multiplex, wherein upstream communication is by time division multiplex access, wherein a broadcast channel is transmitted once and once only to all recipients on all the streams, wherein one of said NTE and said ONU comprises a broadcast comparator for checking all the streams for broadcast cells, and wherein any of said NTE and/or ONU is operative for extracting broadcast traffic from any of the streams.

2. The network as claimed in claim 1, wherein point to point data is carried as broadcast data on another stream to one of the recipients.

3. The network as claimed in claim 1, wherein wave division multiplexing is used to combine the plurality of the streams.

4. The network as claimed in claim 1, wherein transmission over the network is by the use of a plurality of optical wavelengths, each wavelength carrying a number of the streams.

5. The network as claimed in claim 1, wherein ranging of one of said NTE and said ONU by the head end unit is carried out using controlled error encoding.

6. The network as claimed in claim 1, wherein each one of said NTE and said ONU has a unique identity provided during manufacture.

7. The network as claimed in claim 1, wherein each group has two, upstream and downstream, separate, logical, asynchronous transfer mode pipes, the downstream pipe from the head end unit to the respective group having a capacity greater than that of the upstream pipe from the respective group to the head end unit.

8. The network as claimed in claim 7, including provision for carrying plain old telephone system (POTS) communications, wherein a cell within the downstream pipe carries 47 timeslots of a 2 Mbit/s stream, and wherein one of the groups selects octets from the cell; and wherein, in the upstream direction, a control stream has capacity for each group to send 2×64 k channels embedded in the respective stream.

9. The network as claimed in claim 7, wherein each downstream pipe has a nominal capacity of 155 Mbit/s, and each upstream pipe has a nominal capacity of 52 Mbit/s.

10. The network as claimed in claim 1, wherein the head end unit comprises a master unit and a plurality of band units.

11. The network as claimed in claim 1, wherein the streams have respective phases which are adjusted so that the streams are equal times apart.

12. The network as claimed in claim 1, wherein each of the groups is controlled by the head end unit via one of the plurality of the streams in which the respective group checks the respective stream via which it is controlled for general control cells and checks all the streams for the broadcast cells.

* * * * *